Sept. 21, 1948. N. MOSELEY 2,449,666
CULINARY STRAINER FOR PUREEING FOOD
Filed Jan. 11, 1945
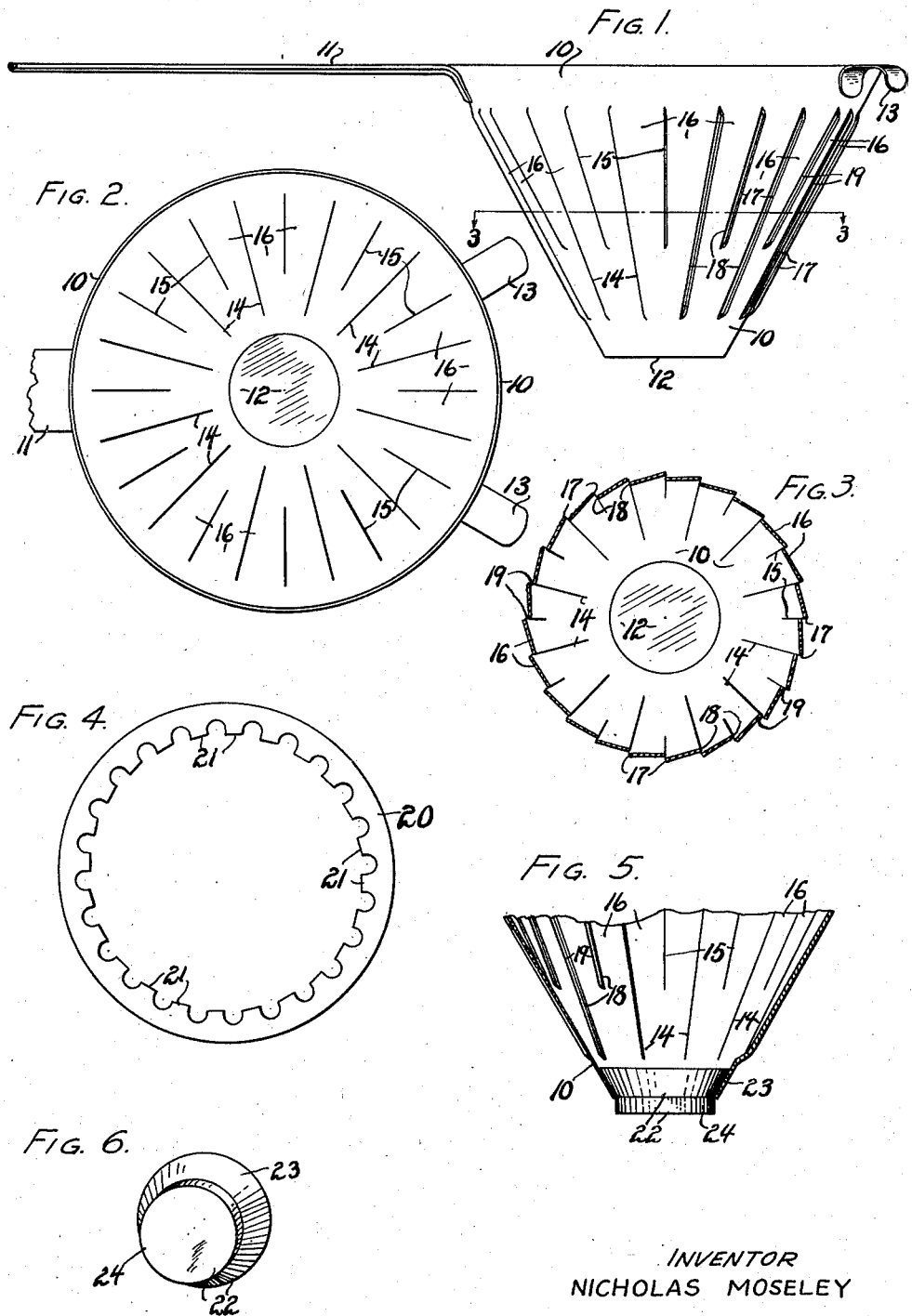
INVENTOR
NICHOLAS MOSELEY
By Seymour, Carter & Nichols
ATTORNEYS Patented Sept. 21, 1948

2,449,666

UNITED STATES PATENT OFFICE 2,449,666

CULINARY STRAINER FOR PURÉEING FOOD

Nicholas Moseley, Sandy Hook, Conn.

Application January 11, 1945, Serial No. 572,376

6 Claims. (Cl. 146—172)

The present invention relates to strainers and relates more particularly to strainers of a type especially well suited for puréeing vegetables and other foodstuffs.

One of the objects of the present invention is to provide a superior strainer so constructed as to enable foodstuffs to be puréed or sauced with rapidity and with minimum effort.

Another object of the present invention is to provide a superior strainer of the character referred to, which may be readily and conveniently cleaned.

A further object of the present invention is to provide a strainer which may be readily utilized for straining orange juice and the like in a rapid and efficient manner, while at the same time being also suitable for the rapid and effective puréeing or saucing of foodstuffs.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a view in side elevation of one form of strainer embodying the present invention;

Fig. 2 is a top or plan view thereof with the outer portion of the handle broken away;

Fig. 3 is a transverse sectional view taken on the line 3—3 of Fig. 1;

Fig. 4 is a top or plan view of an adjusting-ring suitable for use in effecting the adjustment of the slot-like egress-passages of the strainer of the preceding figures;

Fig. 5 is a broken view in vertical central section of the lower portion of a modified form of strainer illustrating a removable bottom-wall or plug-member therefor; and Fig. 6 is a perspective view of the bottom-wall or plug-member of the strainer of Fig. 5.

The strainer herein chosen for purposes of illustrating the present invention comprises a body 10 in the form of an inverted truncated cone. The said body 10 may be conveniently produced by drawing-up or stamping sheet material such, for instance, as stainless steel. Obviously, if desired, the said body may be folded up from any desired sheet material.

Preferably and as shown, the body 10 has welded or otherwise secured to its top-portion a substantially-radial handle 11. In the strainer-assembly illustrated in Figs. 1, 2 and 3, the bottom of the body 10 is closed by a permanent rigid bottom-wall which may be either perforate or imperforate as desired.

To provide for supporting the strainer-structure within the upper-portion of a bowl or other vessel, the upper edge of the body 10 has secured thereto, two circumferentially-spaced-apart outwardly-projecting supporting-fingers 13—13. The said supporting-fingers 13—13, in conjunction with the handle 11, may be utilized to support the strainer-structure during the puréeing or saucing operation or subsequent thereto to effect drainage if desired.

The body 10 is provided with a plurality of long slits 14 extending lengthwise thereof and equidistantly spaced from each other in a circumferential direction, as is especially well shown in Fig. 2. Intermediate the long slits 14, the body-member is formed with a similar number of short slits 15 which have their upper edges substantially in the same plane as the upper edges of the long slits 14, but which have their respective lower edges located in a plane above the lower edges of the long slits 14, as is especially well shown in Figs. 1, 2, 3 and 5.

The material lying intermediate each slit 14 and its next adjacent slit 15 provides one of a plurality of similar panels 16. Each panel 16 has its clockwise edge 17 (as viewed from the top) located outwardly with respect to the counterclockwise edge 18 of the immediately-next-adjacent panel 16 so as to provide a slot-like egress-passage 19 leading outwardly from the interior of the body 10 in a clockwise and generally circumferential direction. The respective edges 17 of the panels 16 may be aptly termed "leading-edges" while the respective edges 18 may be termed "trailing-edges."

In the instance shown and as above described, the slot-like egress-passages 19 open in a clockwise direction so that as suitable foodstuffs are wiped or otherwise forced in a clockwise direction within the interior of the body 10, the relatively-sharp trailing-edges 18 of each of the plurality of panels 16 will effect the cutting of the food when required, to provide for its passage in finely-divided form through the said egress-passages 19. It is obvious, of course, that if desired the panels 16 or their equivalent may be deflected or biased in an opposite direction to provide a strainer which will have its slot-like egress-passages opening in a counterclockwise direction.

During the puréeing or saucing operation, the strainer-structure may be supported within the upper portion of a bowl or the like, by concurrently resting the handle 11 and the supporting-fingers 13—13 upon the upper edge of such a bowl.

After the puréeing or saucing operation has been completed and it is desired to clean the strainer-structure, the interior thereof may be wiped by means of a dishcloth or brush in a clockwise direction so that the cleansing medium may be wiped directly through the slot-like egress-passages 19. In this manner, and because the trailing-edges 18 may be directly wiped, the biased panels 16 afford a direct help in effecting the thorough cleansing of the strainer-structure, in addition to serving as means for saucing or puréeing vegetables or the like.

Should it be desired to increase the dimensions of the egress-passages 19, an adjusting-ring such as 20 (Fig. 4) may be provided. The said adjusting-ring 20 is formed with a plurality of inwardly-extending adjusting-fingers 21 each having its inner edge biased or tangentially arranged to substantially conform to the biasing of the panels 16.

The adjusting-ring 20 may be slipped upwardly over the lower end of the strainer-structure and moved upwardly sufficiently to engage each of its series of adjusting-fingers 21 with the outer surface of one of the panels 16 adjacent the trailing-edge thereof. Now should the adjusting-ring 20 or its equivalent be drawn further upwardly, its adjusting-fingers 21 will serve to inwardly deflect the trailing-portion of each of the panels 16, to thereby increase the radial dimensions of the slot-like egress-passages 19.

Instead of providing the body 10 with a rigid or fixed permanent bottom-wall 12 as is shown in Figs. 1, 2 and 3, the said body may be provided with a removable bottom-wall or plug-member generally designated by the reference character 22 and illustrated in Figs. 5 and 6. The said plug-member has an upper conical-portion 23 which is adapted to seat in the interior of the lower-portion of the body in a manner sufficiently close to retain the desired material in the body 10, as is shown in Fig. 5. Depending from the conical-portion 23 of the plug-member 22, is a cylindrical-portion 24 which is especially well adapted to prevent the plug-member from becoming inadvertently canted or tilted within the body 10.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A culinary strainer constructed and arranged for puréeing or saucing food, and including a hollow conical body slitted substantially longitudinally to divide the said body into a plurality of panels, the said panels being transversely biased in a direction substantially circumferentially of the body to provide an egress-passage between the leading-edge of one of said panels and the trailing-edge of the next-succeeding panel, and the said egress-passage being directed in a generally-circumferential direction.

2. A culinary strainer constructed and arranged for puréeing or saucing food, and including a hollow conical body provided with alternating relatively-long and relatively-short slits extending substantially longitudinally of the body to divide the same into a plurality of panels each having one long edge and an opposite short edge, the said panels being transversely biased in a direction substantially circumferentially of the body to provide an egress-passage between the leading-edge of one of said panels and the trailing-edge of the next-succeeding panel, and the said egress-passage being directed in a generally-circumferential direction.

3. A culinary strainer constructed and arranged for puréeing or saucing food, and including a hollow conical body slitted substantially longitudinally to divide the said body into a plurality of panels, the said panels being transversely biased in a direction substantially circumferentially of the body to provide an egress-passage between the leading-edge of one of said panels and the trailing-edge of the next-succeeding panel, and the said egress-passage being directed in a generally-circumferential direction; the said body being truncated at its lower end and provided with a transversely-extending bottom-wall.

4. A culinary strainer constructed and arranged for puréeing or saucing food, and including a hollow conical body provided with alternating relatively-long and relatively-short slits extending substantially longitudinally of the body to divide the same into a plurality of panels each having one long edge and an opposite short edge, the said panels being transversely biased in a direction substantially circumferentially of the body to provide an egress-passage between the leading-edge of one of said panels and the trailing-edge of the next-succeeding panel, and the said egress-passage being directed in a generally-circumferential direction; the said body being truncated at its lower end and provided with a transversely-extending bottom-wall.

5. A culinary strainer constructed and arranged for puréeing or saucing food, and including a hollow conical body slitted substantially longitudinally to divide the said body into a plurality of panels, the said panels being transversely biased in a direction substantially circumferentially of the body to provide an egress-passage between the leading-edge of one of said panels and the trailing-edge of the next-succeeding panel, and the said egress-passage being directed in a generally-circumferential direction; the said body being truncated at its lower end and having a removable bottom-wall inserted thereinto.

6. A culinary strainer constructed and arranged for puréeing or saucing food, and including a hollow conical body provided with alternating relatively-long and relatively-short slits extending substantially longitudinally of the body to divide the same into a plurality of panels each having one long edge and an opposite short edge, the said panels being biased in a direction substantially circumferentially of the body to provide an egress-passage between the leading-edge of one of said panels and the trailing-edge of the next-succeeding panel, and the said egress-passage being directed in a generally-circumferential direction; the said body being truncated at its lower end and having a removable bottom-wall inserted thereinto.

NICHOLAS MOSELEY.

REFERENCES CITED

The following references are of record in the file of this patent:

UNITED STATES PATENTS

| Number | Name | Date |
| --- | --- | --- |
| 744,060 | Frye | Nov. 17, 1903 |
| 908,090 | Greer | Dec. 29, 1908 |
| 1,028,065 | Smith | May 28, 1912 |
| 1,055,675 | Smith | Mar. 11, 1913 |
| 1,246,291 | McHale et al. | Nov. 13, 1917 |
| 1,594,023 | Sorenson | July 27, 1926 |
| 1,785,161 | Wangelin | Dec. 16, 1930 |